United States Patent [19]

Kinberg

[11] Patent Number: 4,700,965
[45] Date of Patent: Oct. 20, 1987

[54] BUBBLE APPARATUS FOR WHEELED TOY
[75] Inventor: Benjamin Kinberg, New York, N.Y.
[73] Assignee: Empire of Carolina, Inc., Tarboro, N.C.
[21] Appl. No.: 921,275
[22] Filed: Oct. 21, 1986
[51] Int. Cl.$^4$ .................. B62K 1/00; A63H 33/28
[52] U.S. Cl. ................. 280/289 D; 280/289 H; 446/16
[58] Field of Search ............. 446/16, 15, 18, 21; 280/289 R, 289 H, 289 D

[56] References Cited
U.S. PATENT DOCUMENTS
2,675,641  4/1954  Baggott .................. 446/18
4,556,392  12/1985  Chang .................... 446/16

FOREIGN PATENT DOCUMENTS
890155  9/1953  Fed. Rep. of Germany ........ 446/16

Primary Examiner—Mickey Yu
Attorney, Agent, or Firm—B. B. Olive

[57] ABSTRACT

A child's toy for forming bubbles is illustrated as comprising a tricycle mounting a reservoir for holding a bubble forming liquid, a front wheel actuated dip-arm having a film support and movable between a first position in which the film support dips into the reservoir liquid and a second position above the reservoir and an electrically operated fan for forcing air through the film to form bubbles.

5 Claims, 15 Drawing Figures

BUBBLE APPARATUS FOR WHEELED TOY

TECHNICAL FIELD

The invention relates to wheeled toys and particularly to wheeled toys with means to create bubbles for amusement.

BACKGROUND ART

U.S. Pat. No. 3,626,631 describes a bubble apparatus mounted on a bicylce and actuated by the wind stream. U.S. Pat. No. 4,045,049 teaches a bicycle-mounted bubble apparatus using a battery-operated fan and an air-propelled, film-forming paddle wheel as part of the bubble-forming apparatus. U.S. Pat. No. 4,128,962 also teaches a bicycle-mounted, air stream-operated, bubbleforming apparatus useful for background.

With the foregoing prior art in mind, the present invention has as an object providing a wheeled toy with an improved bubble apparatus utilizing a wheel of the toy as an actuating mechanism for a film-forming device with visual mechanicallymoving structure to be enjoyed in conjunction with observing bubbles produced from the film.

DISCLOSURE OF INVENTION

In the illustrated embodiment of the invention an improved bubble apparatus is mounted on a tricycle. The bubble apparatus comprises a battery-operated fan controlled by a switch on one handle bar of the tricycle. On the front of the tricycle is mounted a reservoir for holding a soap solution. A pivoted lever arm having a film-forming pick-up is actuated by rotation of the front wheel of the tricycle. Thus, as the tricycle progresses bubbles can be formed when desired by closing the switch on the handle bar to force an air stream against the film on the film pickup and the mechanical motion is visually observable for added amusement.

BEST MODE FOR CARRYING OUT THE INVENTION

Figure 1:
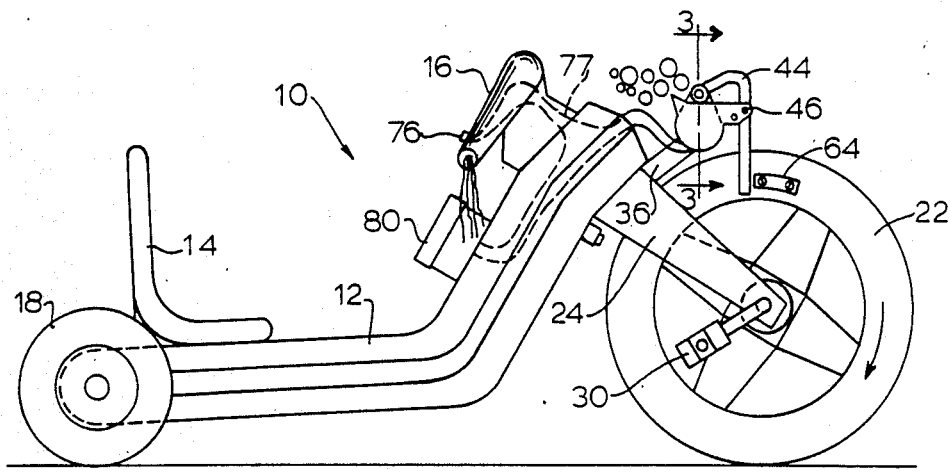
FIG. 1 is a view of one side of a toy tricycle embodying a soap bubble apparatus according to the invention.
Figure 2:
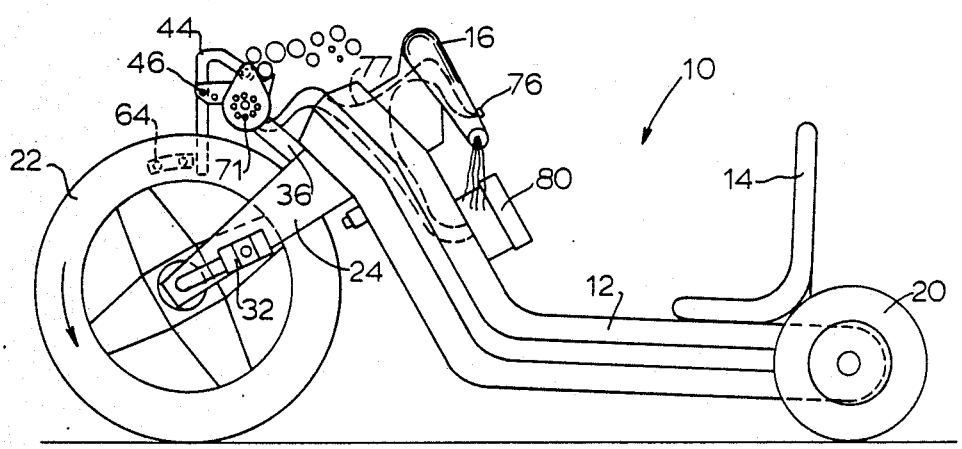
FIG. 2 is a side view of the tricycle of FIG. 1 taken from the opposite side.

Making reference to FIGS. 1 and 2 of the drawings, there is illustrated a child's tricycle 10 embodying the invention and having a chassis 12, a seat 14, a handle bar structure 16, and rear wheels 18, 20. A large, front wheel 22 is journaled within the fork 24 of the handle bar structure 16 for sterring the tricycle 10 with large wheel 22 being rotated by means of a pair of pedals 30, 32.

Figure 14:
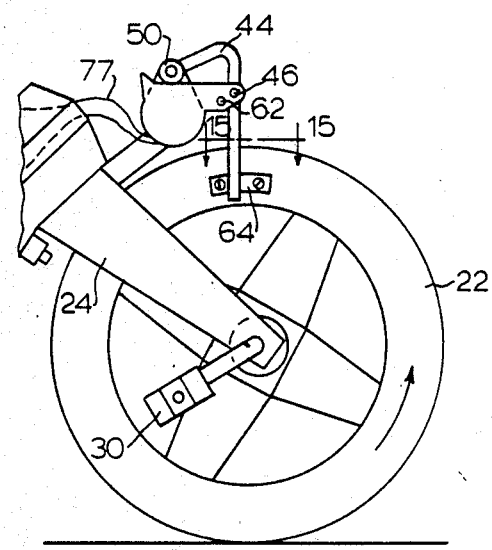
FIG. 14 is a partial side view showing how the tapered striker block allows the film-forming lever to slide on the side of the tapered striker block when the front wheel of the tricycle rolls backward.
Figure 15:
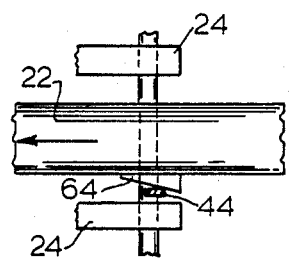
FIG. 15 is a partial plan view on line 15—15 of FIG. 14 showing the position of the film-forming lever on the striker block when sliding as in FIG. 14.

What has thus far been described represents a typical child's tricycle structure. What will next be described is the bubble-making mechanism associated with the tricycle 10 and embodying the present invention. In this regard, fork 24 mounts a support arm 36 which in turn mounts a reservoir 40 having a top opening 42. In use, reservoir 40 is filled with a film-forming, soap-like solution. A film-forming lever 44 pivoted on pin 46 mounts a film-forming and film pickup ring structure 50 having an aperture 52 and a series of radial, spaced-apart ribs 54 which provides substantial surface area for retaining the film-forming solution. Arm 36, reservoir 40 and lever 44 pivot with fork 24. Film lever 44 is normally held in a bubble-forming position such as in FIG. 4 by means of a molded lever spring 60 extending around a stop pin 62 as best seen in FIG. 4. In such bubble-forming position, the later referred-to fan discharge tube 82 is aligned with the aperture 52 of film-forming ring 50. Lever 44 is actuated by means of a striker block 64, tapered from front to rear, whose front surface strikes lever 42 on each rotation of wheel 22 so as to cause the film ring 50 to dip into the reservoir 40. Thus, on each rotation, the film lever dips once into the reservoir 40 to form a film on ring 50 and after becoming disengaged from the striker block 62 returns to the raised bubble-forming position such as in FIGS. 1, 3, and 4. This sequence is further illustrated in FIGS. 10-13. The tapered form of the striker block 64 allows the child to reverse the tricycle and thus reverse the front wheel 22 without actuating the film lever 44 as illustrated in FIGS. 14-15.

Figure 3:
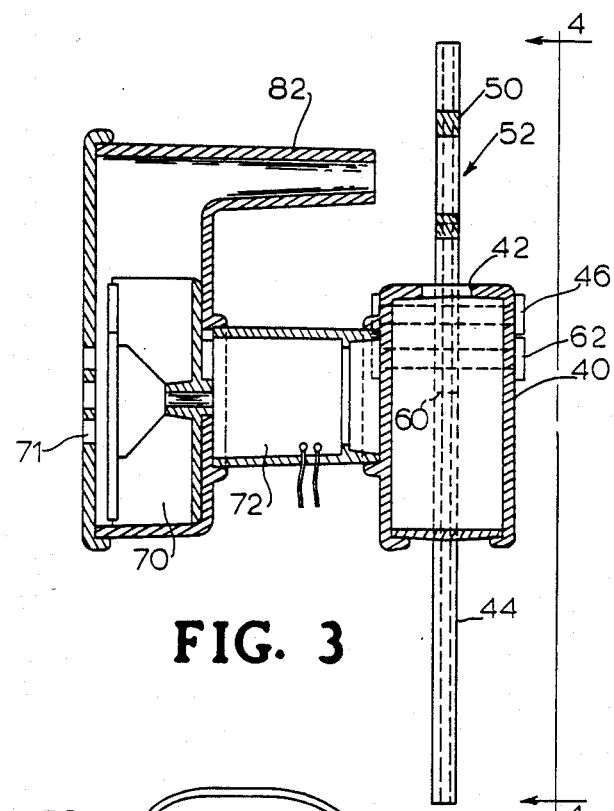
FIG. 3 is a cross section view through the bubble-forming apparatus with surrounding structure eliminated for illustration.
Figure 4:
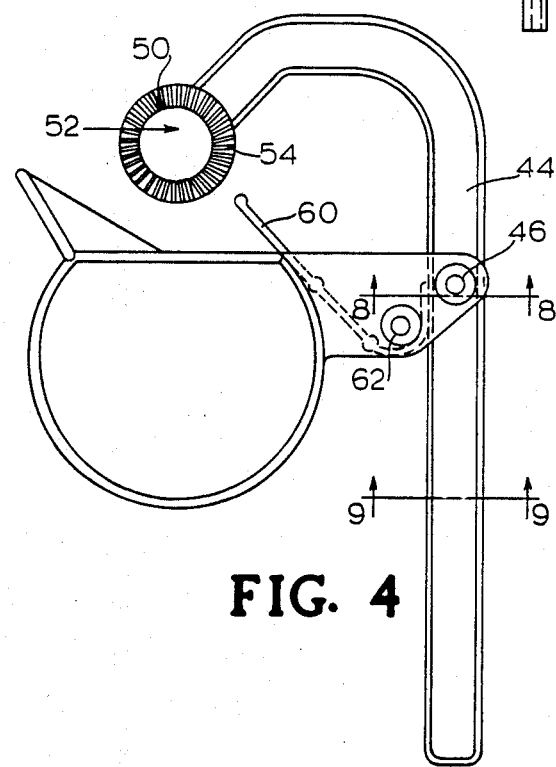
FIG. 4 is a side view of the bubble film-forming apparatus removed from the tricycle frame.
Figure 5:
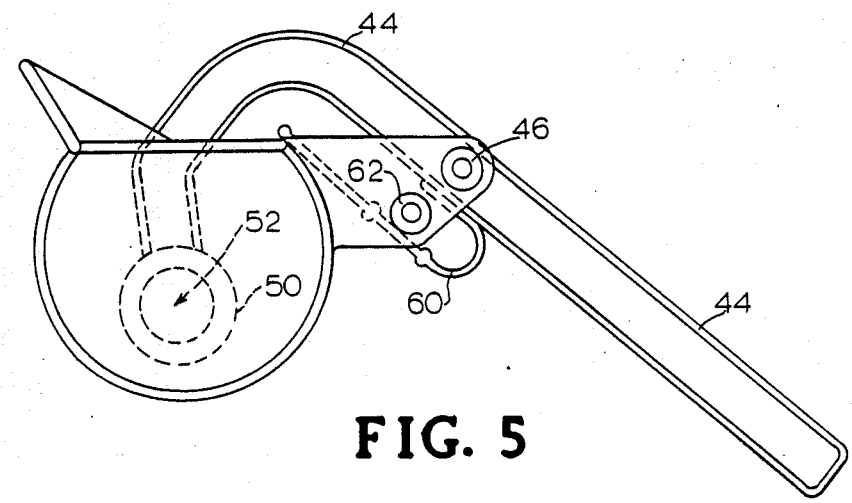
FIG. 5 illustrates the bubble film-forming apparatus of FIG. 4 dipping into the film-forming solution.
Figure 6:
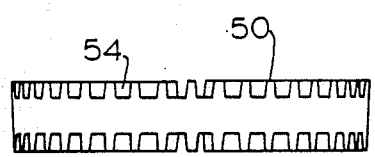
FIG. 6 is a top view of the film pick-up.
Figure 7:
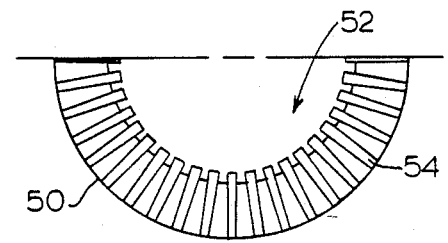
FIG. 7 is a partial side view of the film pick-up.
Figure 8:
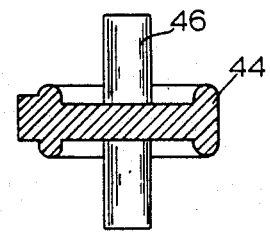
FIG. 8 is a section view taken through line 8—8 of FIG. 4.
Figure 9:
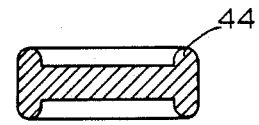
FIG. 9 is a section view taken through line 9—9 of FIG. 4.
Figure 10:
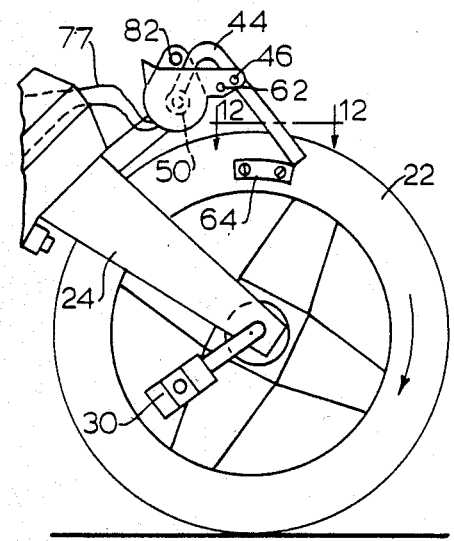
FIG. 10 is a partial side view showing the film-forming lever being initially actuated by the wheel striker block.
Figure 11:
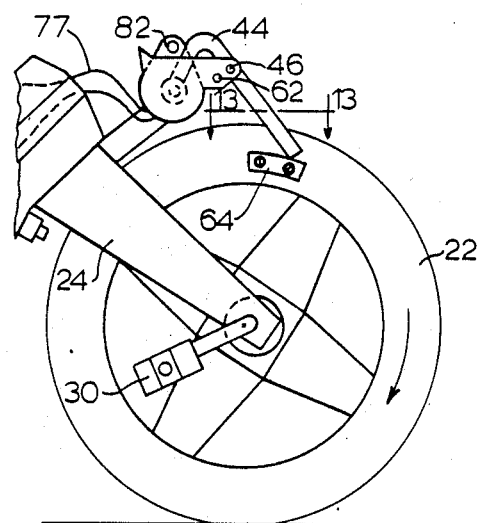
FIG. 11 is a partial side view showing the film-forming lever fully actuated by the wheel striker block.
Figure 12:
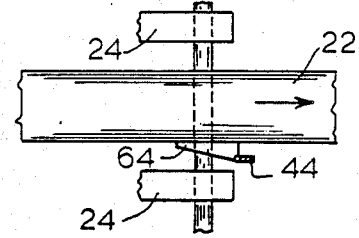
FIG. 12 is a partial plan view taken on line 12—12 of FIG. 10 showing the position of the film-forming lever on the striker block when positioned as in FIG. 10.
Figure 13:
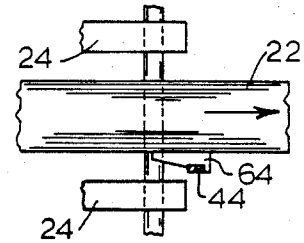
FIG. 13 is a partial plan view taken on line 13—13 of FIG. 11 showing the position of the film-forming lever on the striker block when positioned as in FIG. 11.

Bubbles are formed when desired by blowing a blast of air through the film retained by the film ring 50 when in the position shown in FIGS. 1, 3, and 4. This blast of air is in turn drawn through fan inlet 71 and is formed by means of a fan 70 rotated by an electric motor 72 energized through an electric switch 76 mounted on handle bars 16 and connected through appropriate wiring 77 to fan 70 and a battery supply in box 80. When switch 76 is closed, power is supplied to fan motor 72 through appropriate wiring 77 from battery box 80 having a suitable set of removable and replaceable or rechargeable dry cell batteries, not shown.

During operation, it will be seen that, as the child pedals the tricycle, bubbles can be formed selectively by pressing the electric switch 76 whenever the film-forming ring 50 is raised and the film-forming ring aperture 52 is substantially aligned with the fan discharge tube 82. This condition allows an air blast to exit through tube 82 and to form bubbles as schematically illustrated in FIG. 3. The child quickly learns both how to form bubbles and gains added amusement from observing the mechanical motion.

What is claimed is:

1. A child's riding toy for forming bubbles comprising:
   (a) a tricycle structure including a chassis, a pair of rear wheels, a relatively large front wheel, a pair of handlebars and a fork connected to said handlebars and mounting said front wheel;
   (b) a reservoir supported on and outwardly from said fork and above said front wheel;
   (c) a dip-arm pivotally mounted on said reservoir for movement about a transversely extending axis, said dip-arm having an aperture defined by a film support for supporting the boundaries of bubble pouring film located on said film support and covering said aperture, said dip-arm being supported for movement between a first position in which said film support dips into said reservoir to form a film over said aperture and a second position in which said film support, aperture and the film formed thereon are above said reservoir;
   (d) a spring mounted on said reservoir and operative to force said dip-arm to said second position;
   (e) actuating means on said front wheel for engaging and pivoting said dip-arm to said first position against the tension of said spring on each rotation of said front wheel;
   (f) a fan mounted on an electric motor drive adjacent said reservoir and having an outlet to force air circulated by said fan through said aperture when said dip-arm is in said second position and said fan is operated; and
   (g) an interconnected switch, battery supply and associated wiring for operating said fan, said switch being mounted on a selected one of said handlebars.

2. A child's tricycle toy for forming bubbles comprising:
   (a) a wheel mounting structure providing a fork mounted ground engaging front wheel rotated by manual movement of the toy during normal use of the toy;
   (b) a reservoir supported on said structure for holding a film forming fluid;
   (c) a dip-arm pivotally mounted on said reservoir having an aperture defined by a film support for supporting the boundaries of a bubble forming film covering the aperture, said dip-arm being supported for movement between a first position in which said film support dips into said reservoir to form a film over said aperture and a second position in which said film support aperture and the film formed thereon are above said reservoir, said dip arm mounting a spring tending to force said dip arm to said second position;
   (d) actuating means on said wheel for engaging and moving said dip-arm between said positions, said actuating means comprising a striker block mounted on said front wheel for engaging and pivoting said dip-arm to said first position against the tension of said spring on each forward rotation of said front wheel;
   (e) a fan having an electric motor drive and supported by said structure and having an outlet located to force air circulated by said fan through said aperture to form bubbles from said film when said dip-arm is in said second position and said fan is operated; and
   (f) operator means including a switch, battery supply, and associated wiring for selectively operating said fan electric motor drive to thereby control forming of bubbles.

3. A child's toy as claimed in claim 2 wherein:
   (a) said tricycle includes a pair of handlebars for steering said front wheel fork;
   (b) said switch is mounted on one of said handlebars; and
   (c) said reservoir, dip-arm and fan are supported on said fork mounting said front wheel and pivot therewith during steering of said tricycle.

4. A childs toy as claimed in claim 2 wherein said dip-arm and reservoir are both located so that dipping of said dip-arm into said reservoir is visible to the rider of said toy during operation thereof.

5. A child's tricycle toy for forming bubbles comprising:
   (a) a wheel mounting structure providing a fork mounted ground engaging front wheel rotated by manual movement of the toy during normal use of the toy;
   (b) a reservoir supported on said structure for holding a film forming fluid;
   (c) a dip-arm pivotally mounted on said reservoir having an aperture defined by a film support for supporting the boundaries of a bubble forming film covering the aperture, said dip-arm being supported for movement visible to the rider of said toy between a first position in which said film support dips into said reservoir to form a film over said aperture and a second position in which said film support aperture and the film formed thereon are above said reservoir and mounting means tending to force said dip-arm to said second position;
   (d) actuating means mounted on said front wheel for intermittently engaging and moving said dip-arm between said positions on each forward rotation of said front wheel;
   (e) a fan having an electric motor drive and supported by said structure and having an outlet located to force air circulated by said fan through said aperture to form bubbles from said film when said dip-arm is in said second position and said fan is operated; and
   (f) operator means including a switch, battery supply, and associated wiring for selectively operating said fan electric motor drive to thereby control forming of bubbles.

* * * * *

UNITED STATES PATENT AND TRADEMARK OFFICE
CERTIFICATE OF CORRECTION

PATENT NO. : 4,700,965
DATED : October 20, 1987
INVENTOR(S) : Benjamin Kinberg

It is certified that error appears in the above-identified patent and that said Letters Patent is hereby corrected as shown below:

Column 1, line 11 correct "bicylce" to read --bicycle--.

Column 2, line 19 correct "sterring" to read --steering--.

Column 3, lines 18-19 correct "pouring" to read --forming--.

Signed and Sealed this

Fifteenth Day of March, 1988

*Attest:*

DONALD J. QUIGG

*Attesting Officer*

*Commissioner of Patents and Trademarks*